June 12, 1962 T. A. PICKERING ET AL 3,038,969
PBX TRUNK HUNTING IN ELECTRONIC SWITCHING TELEPHONE SYSTEMS
Filed Nov. 20, 1959
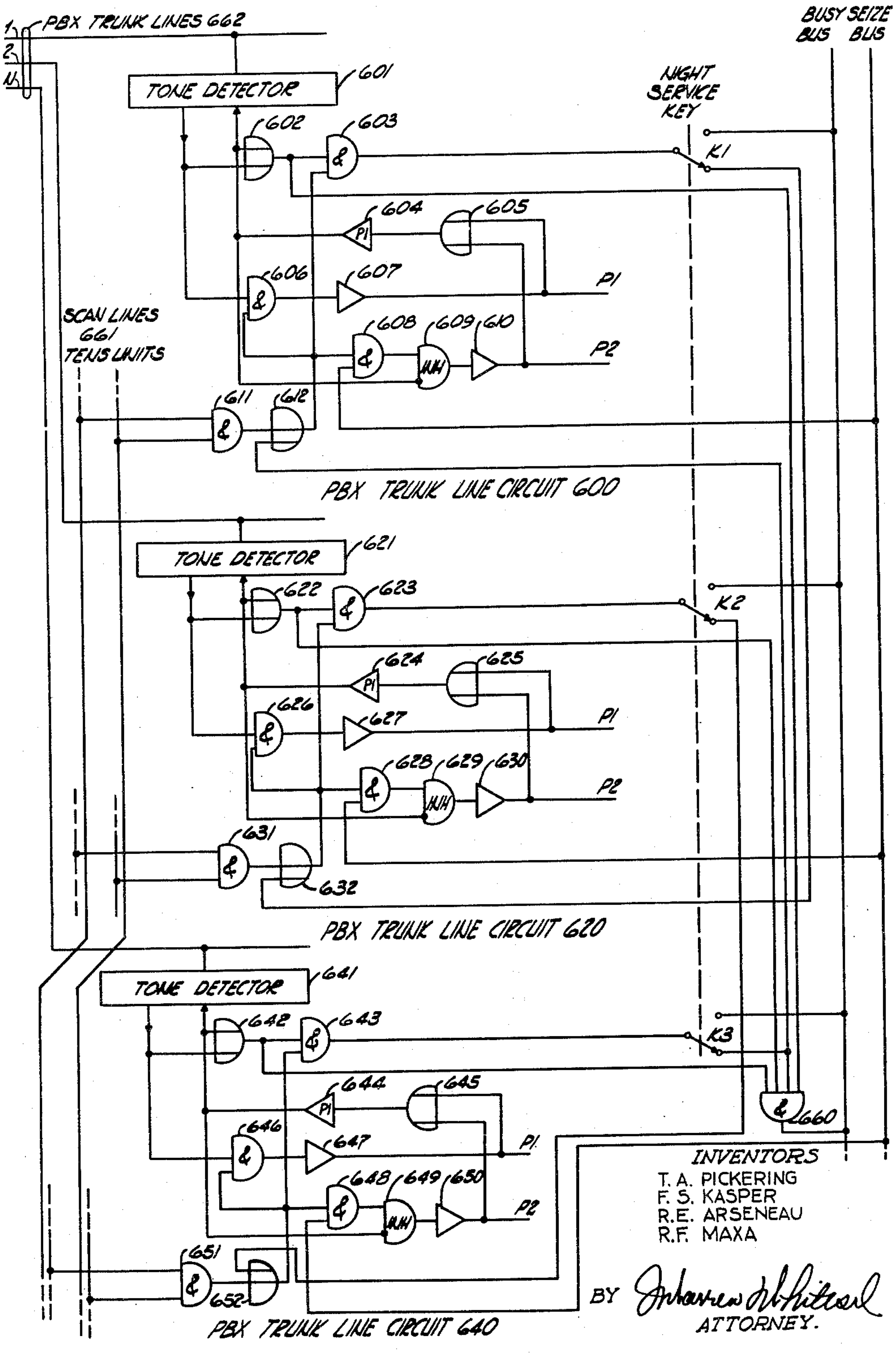
INVENTORS
T. A. PICKERING
F. S. KASPER
R. E. ARSENEAU
R. F. MAXA
BY [signature]
ATTORNEY.

3,038,969
Patented June 12, 1962

3,038,969

PBX TRUNK HUNTING IN ELECTRONIC SWITCHING TELEPHONE SYSTEMS

Thomas A. Pickering, Orlando, Fla., Frank S. Kasper, Oak Lawn, and Roger E. Arseneau, Chicago, Ill., and Richard F. Maxa, Santee, Calif., assignors to International Telephone and Telegraph Corporation, New York, N.Y., a corporation of Maryland
Filed Nov. 20, 1959, Ser. No. 854,496
8 Claims. (Cl. 179—18)

This invention relates to electronic switching telephone systems and more particularly to PBX trunk hunting in such systems.

Reference is made to a co-pending application by Radcliffe and Pickering entitled "Electronic Switching Telephone System," S.N. 837,400, filed Sept. 1, 1959, and assigned to the assignee of the subject application. The drawing annexed hereto is identical to FIG. 6 of the Radcliffe et al. application which shows an entire telephone system.

Recently, electronic switching telephone systems have been developed to replace or supplement existing electromechanical switching equipment. In addition to providing for the completion of simple calls which are merely extended between subscriber stations, it is also necessary for electronic systems to complete more complicated calls such as those involving PBX trunk hunting and night service. Moreover, the newer equipment must be compatible with older equipment and subscribers should not be expected to change their calling habits. For example, it is conventional for calling subscribers to transmit signals which direct calls either to individual subscriber stations or to any idle equipment—as when any idle one of a group of private branch exchange (PBX) trunks is used to extend a call from a central office to an operator position at a PBX. If the PBX operator is not at position, the PBX lines are individually connected to particular subscriber lines and a night service key is operated. Thereafter, the central office equipment does not search over the PBX group, but seizes the specific line that is designated by the subscriber transmitted signals.

An object of this invention is to provide new and improved PBX trunk hunting equipment for use in electronic switching telephone systems.

Another object of this invention is to provide line circuits which may terminate either PBX trunks or individual subscriber lines.

Still another object of this invention is to provide for PBX trunk hunting and night service.

In accordance with this invention, spaced apart switching elements are controlled on a time division basis responsive to a coincidence of signals in line circuits which may be individually associated with either subscriber lines or PBX trunks—a night service key being provided to select between PBX trunk hunting and individual service. The identity of a subscriber line or PBX trunk group is determined by the occurrence of a particular time frame which is selected responsive to subscriber transmitted, directory number indicating signals. When the night service key is in one position, each busy PBX trunk line circuit is adapted to forward a busy indicating signal to prepare another PBX trunk line circuit to extend a call. In this manner, each PBX trunk line circuit may be prepared to extend a call during a time frame which is selected responsive to subscriber transmitted digital information and a busy signal is not returned to a calling subscriber unless all lines in a PBX group are busy. In another position, the night service key breaks the circuit over which the busy marking is forwarded and completes a circuit to return a busy signal if the line which is actually called is busy and without regard to any idle conditions which may prevail elsewhere in the PBX trunk group.

The above mentioned and other objects of this invention together with the manner of obtaining them will become more apparent and the invention itself will be best understood by making reference to the following description of an embodiment of the invention taken in conjunction with the accompanying single sheet of drawings which shows three PBX trunk groups.

Where possible simple terms are used and specific items are described hereinafter to facilitate an understanding of the invention; however, it should be understood that the use of such terms and references to such items are not to act in any manner as a disclaimer of the full range of equivalents which is normally given under established rules of Patent Law. For example, the invention is described in connection with PBX trunk hunting when it may in fact be used in any system which requires selective action, e.g. as a selector switch, as a selector of individual subscriber lines which extend to a multi-line telephone, as a means for assigning priority to certain calls wherein some in a group of lines are artificially made busy to all except executive phones, etc. Quite obviously, other examples could be selected to illustrate the fact that a wide range of equivalents should be given.

*Brief Description*

The subject invention may, of course, be used in connection with any suitable switching system; however, the specific details which are shown in the annexed drawing are fully explained in the above identified Radcliffe et al. application. Therefore, no attempt will be made herein to describe all components in an exhaustive manner.

Briefly, the drawing shows three PBX trunk lines 662 each of which is identified by an individual time frame or slot that is defined by potentials which are applied to "SCAN" lines 661 by a clock-like control. While the details of the clock-like control are not shown, there are a plurality of tens and units scan lines which are pulsed sequentially. That is, a units counter counts the outpulses of a free running generator and pulses individual units scan lines in accordance with the step to which the units counter has advanced as it counts. A marking is applied continuously to a tens scan line while the units counter completes its cycle after which a tens counter is advanced to mark the next tens scan line while the units counter repeats its cycle by pulsing each units scan line in turn. Thus, a coincidence of markings on the tens and units scan lines provides time frames which identify the lines of the system.

Each of the line circuits 600, 620 and 640 is a two way circuit which may control the extension of calls either to a line or from a line depending upon whether a first sleeve or private conductor P1 is marked or a second sleeve or private conductor P2 is marked. During outgoing or calling conditions, a subscriber removes a handset or receiver to transmit a seize tone over a line—such as line 1—whereupon detector 601 causes sleeve conductor P1 to be marked in order that a space switching element—such as a line switch—may extend a call. During incoming or called conditions, a register receives and stores digital information which identifies a called line whereupon markings are transmitted over the "SEIZE BUS" during an indicated time frame to cause a line circuit to mark sleeve conductor P2 and operates a spaced apart switching element—such as a connector crosspoint. The telephone system may then interconnect the line switch and connector in any suitable manner.

In order to provide PBX trunk hunting, a register (not shown) transmits markings simultaneously over scan lines 661 and the "SEIZE BUS" to enable a first line circuit in a PBX group to cause a connector-like switching which extends a call in the manner that all calls are extended. However, unlike other line circuits a plurality of PBX line circuits have a common chain circuit (i.e. via keys K1—K3 in the position shown) which in effect passes the busy markings from line circuit to line circuit until an idle line is found at which time the connector-like switch-through is accomplished. If keys K1—K3 are operated, the chain is broken and each PBX line circuit functions as an ordinary line circuit to provide individual or night service.

Each line circuit has an AND gate (611, 631, 651) which is individually and uniquely connected to the scan lines to be rendered conductive responsive to a coincidence of specific tens and units signals. For example, if the input terminals of AND gate 611 are connected to scan lines 2 and 7, PBX trunk line circuit 600 is prepared to extend a call during the twenty-seventh time frame of each cycle. AND gate 631 may be connected to the first tens and units scan lines, for example, thereby causing PBX trunk line circuit 620 to respond to the directory number eleven. In a similar manner, each line circuit may be individually identified by a cyclically recurring time frame. Let it be assumed that a PBX call is extended to line circuit 600 at a time when it is busy. As explained above, AND gate 611 conducts during the time frame which is defined by potentials that are applied simultaneously to those of the scan lines to which it connects. Since circuit 600 is busy, a potential is forwarded from gate 603 to turn-on OR gate 632 as if an individually associated time frame had triggered AND gate 631, thereby preparing line circuit 620 to extend a call. In a similar manner, busy markings may be forwarded from AND gate 623 to OR gate 652 and from AND gate 643 to OR gate 612. When all trunks are busy, AND gate 660 conducts to return a busy signal via the "BUSY BUS" during each time frame which may trigger AND gates 611, 631 and 651.

During periods of night service, keys K1—K3 are operated to break the circuits that are used to forward the busy markings. Thereafter, if circuit 600 is busy when AND gate 611 conducts, the output of AND gate 603 is connected to the "BUSY BUS" and there is no trunk hunting. In a similar manner, each of the AND gates 623 and 643 may also cause the transmission of a busy signal.

*Detailed Description*

*Incoming call.*—When an incoming call is extended over a trunk line in group 662—trunk 1, for example—a seizure tone is transmitted from calling equipment to detector 601 thereby turning-on OR gate 602 and marking the uppermost terminals of AND gates 603 and 606. Also responsive to the output signal of OR gate 602, a marking is extended to one of the input terminals of busy marking AND gate 660.

During a time frame which identifies PBX trunk line circuit 600, markings are applied simultaneously to those of the tens and units scan conductors 661 to which AND gate 611 is connected. Responsive thereto, AND gate 611 applies an input signal to OR gate 612 which conducts. The marking applied by OR gate 612 to the upper input terminal of AND gate 608 has no effect at this time. The lower input terminal of AND gate 606 is marked by the output signal of OR gate 612. Since a seizure signal marks the upper input terminal of AND gate 606, there is a coincidence and gate 606 conducts to apply a marking through amplifier 607 to conductor P1, thus closing finder crosspoints in any suitable manner. Also responsive to the output of AND gate 606, a signal is applied via amplifier 607 to an input terminal of OR gate 605 thereby returning a marking through polarity inverter 604 to prevent further response to seize tone by detector 601 and to cause inhibit gate 609 to block response to the output of AND gate 608.

*Outgoing call.*—Incoming calls are fairly simple since a line in trunk group 662 is not seized at the distant end unless it is idle; however, outgoing calls are a little more complex since the same directory number may cause any one of a number of trunk lines to be seized, depending upon the idle or busy conditions thereof.

Briefly, during each time frame which indicates a PBX trunk line, AND gate 660 applies a pulse to the "BUSY BUS" if all lines in the PBX group are busy. If any PBX trunk line is idle, an associated link (not shown) applies a pulse to the "SEIZE BUS" during such time frame. Thereafter a first line circuit such as circuit 600 is seized to extend a call. If line 1 of group 662 is busy, a marking is forwarded from the output of AND gate 603 to an input terminal of OR gate 632, thereby preparing line circuit 620 to extend the call. If line circuit 620 is busy, a marking is sent from the output of AND gate 623 to the input of OR gate 652, thereby preparing line circuit 640 to extend the call. In this manner, each line circuit in the PBX group is successively prepared until an idle line is found, at which time the call is extended over such idle line.

In greater detail, a directory number identifying PBX line 1 is dialed into a register (not shown) and, at a time which is determined by the registered information, a busy test is made. If any trunk line in the PBX group is idle, a pulse is applied to the "SEIZE BUS" during each time frame which indicates a PBX line.

A coincidence of markings applied to the tens and units scan conductors causes AND gate 611 and OR gate 612 to become conductive. The output signal of OR gate 612 coincides at the input terminals of AND gate 608 with a seize signal extended over the "SEIZE BUS." Responsive thereto an output signal from AND gate 608 is extended through inhibit gate 609 which is either opened or closed depending upon whether the trunk line individually associated with line circuit 600 is or is not busy. If it is assumed that the trunk line is not busy, the output of AND gate 608 is extended through inhibit gate 609, and amplifier 610 to conductor P2 thereby closing a crosspoint in a connector matrix. If it is assumed that the trunk line associated with line circuit 600 is busy, a signal is extended from either the P1 conductor or the P2 conductor through OR gate 605 and polarity inverter 604 to disable tone detector 601. Also responsive to the signal extended from conductor P1 or P2 through inverter 604, the inhibit terminal (heavily inked dot) of gate 609 is marked, thus preventing the extension of a signal to conductor P2. Still further, responsive to the busy marking applied through inverter 604, OR gate 602 conducts and applies a signal to an input terminal of AND gate 660. The output signal of OR gate 602 energizes the upper input terminal of AND gate 603.

During the time frame which is indicative of the first PBX trunk line, the lower input terminal of AND gate 603 is energized responsive to markings applied from the scan conductors through gates 611 and 612. Therefore, an output signal from AND gate 603 is fed into an input terminal of OR gate 632 which is associated with line circuit 620, thereby preparing line 2 during the time frame that individually identifies line 1. Responsive jointly to the output of the OR gate 632 and to the signal on the "SEIZE BUS" a marking is fed through gates 628, 629, and amplifier 630 in line circuit 620 to the P2 conductor which is individual to the second trunk line circuit thereby closing an appropriate crosspoint. However, if line circuit 620 is busy, an inhibit signal is applied from a "P" conductor through OR gate 625 to block inhibit gate 629 and no marking is applied to conductor P2; rather, a marking is passed from the output terminal of AND gate 623 to an input terminal of OR gate 652, thereby preparing line "N" during the time frame that represents line 1. In this manner, each line circuit in the PBX trunk group is successively prepared to extend a call over the trunk line associated therewith if such line is then idle.

If a directory number indicating line 2 is dialed, line circuit 620 is tested first; if busy, the output of AND gate 623 enables OR gate 652. If circuit 640 is busy, the output of AND gate 643 is applied to an input terminal of OR gate 612, etc. In this manner, there is PBX trunk hunting without regard to which individual PBX line is identified by the directory number which is dialed.

When all PBX trunk lines are busy, signals are applied to three input terminals of busy marking AND gate 660 from OR gates 602, 622, and 642. An all trunks busy indication is given when the fourth input terminal of AND gate 660 is marked by the completion of a chain circuit which may be traced from AND gate 603 through key K1, OR gate 632, AND gate 623, key K2, OR gate 652, AND gate 643, key K3, OR gate 612, and AND gate 603. The fourth terminal of AND gate 660 is marked from key K3. Since all input terminals of AND gate 660 are now marked, a busy indicating potential is applied to the "BUSY BUS" during all time frames which are indicative of any line in a PBX trunk group.

*Night service.*—Each line circuit is connected to be individually enabled by a different one of the time frames—as indicated in the drawing by the fact that each of the AND gates 611, 631, and 651 connects to different scan conductors. During periods of normal PBX service, subscribers are instructed to dial a directory number that identifies line circuit 600 and all line circuits in the PBX group are successively prepared (as explained above) during the time frame representing circuit 600 until an idle trunk is found and the call is extended. During periods when there is no PBX trunk hunting, night service keys K1—K3 are switched and individual subscriber lines are patched to trunks 662. During such periods of night service, calling subscribers are instructed to dial the directory numbers which identify individual lines in the PBX group.

When keys K1—K3 are switched, the outputs of AND gates 603, 623, and 643 in busy line circuits are applied to the "BUSY BUS" and the busy marking signal is not passed-on to cause trunk hunting. In this manner calls may be directed to individual trunks in the PBX group during periods of night service.

While the principles of the invention have been described in connection with specific apparatus, it is to be clearly understood that this description is made only by way of example and not as a limitation on the scope of the invention.

We claim:

1. A telephone system comprising a plurality of lines identified by individually associated time frames and a plurality of line circuits, each of said lines being terminated by an individually associated one of said line circuits, means in each of said line circuits for controlling spaced apart switching elements to extend a call during time frames which identify called lines, means responsive to the receipt of signals indicating a call to a group of said lines for causing a first of said line circuits to operate said switch controlling means during a time frame which identifies at least one line in said group if the line that is individually associated with said first line circuit is then idle, and means responsive to said receipt of signals indicating a call to said group of lines for causing said first line circuit to prepare a second line circuit if the line that is individually associated with said first line circuit is then busy.

2. A telephone system comprising a plurality of lines, a plurality of line circuits, each of said lines being terminated by an individually associated one of said line circuits, first means in each of said line circuits for operating certain switching equipment responsive to calling conditions on the one of said lines which is individually associated therewith, second means in each of said line circuits for operating other switching equipment responsive to the receipt of signals indicating a call to the one of said lines which is individually associated therewith, and means comprising a chain circuit extending through a plurality of said line circuits for successively and individually preparing each of said plurality of line circuits to extend a call responsive to busy conditions on preceding ones of said lines, whereby a line circuit associated with any idle line may operate said other switching equipment responsive to the receipt of signals indicating a call to any line served by said plurality of line circuit.

3. The telephone system of claim 2 wherein said first and second means comprises first and second sleeve conductors respectively, and means comprising an inhibit gate coupled to block current flow over said second sleeve conductor when the one of said lines which is individually associated therewith is busy.

4. The telephone system of claim 2 and means for breaking said chain circuit to prevent said successive preparation of said plurality of line circuits, and means for connecting said line circuits to provide night service.

5. The telephone system of claim 2 and a plurality of scan lines common to said line circuits, means for applying markings representing cyclically recurring time frames to said scan lines, means comprising an AND gate in each of said line circuits, each of said AND gates being coupled to said scan lines to conduct only during individual ones of said time frames which identify the one of said line circuits that includes said coupled AND gate, and in which said chain circuit comprises means for passing busy markings which sequentially prepare each of said plurality of line circuits to extend a call during the time frame that identifies a first line circuit in said plurality.

6. A telephone system comprising a plurality of spaced apart switching means, a group of telephonic lines, a plurality of line circuits, each of said line circuits being individual to a corresponding one of said lines, means for generating a plurality of cyclically recurring time frames, means for individually identifying each of said lines by a corresponding one of said time frames, means responsive to a call to one of said lines in said group for making a busy test on all of said lines in said group, means responsive an idle indication during said busy test for successively preparing each of said lines in said group for extending a call during a time frame which identifies said one line, and means responsive to said last named means for extending said call through one of said spaced apart switching means to an idle line in said group of lines.

7. The telephone system of claim 6 and means for cancelling said busy test on said group of lines and said successive preparation of individual lines during periods of night service whereby each of said lines may be seized only during the one of said time frames which corresponds to said each line.

8. A telephone system comprising a PBX group of trunk lines, means for generating a plurality of cyclically recurring time frames, means for individually identifying each of said trunk lines by a corresponding one of said time frames, switching means associated with each of said trunk lines, means effective when said switching means is in a first operative condition for seizing any idle one of said PBX group of trunk lines during a time frame which represents any one of said PBX trunk lines thereby providing PBX trunk hunting, and means effective when said switching means is in a second operative condition for seizing a particular one of said trunk lines if idle during one of said time frames which individually corresponds to said particular trunk line, thereby providing night service.

References Cited in the file of this patent

UNITED STATES PATENTS

| | | |
|---|---|---|
| 1,667,950 | Ruggles | May 1, 1928 |
| 1,694,623 | Ostline | Dec. 11, 1928 |
| 2,644,041 | Mercer | June 30, 1953 |
| 2,840,641 | Allum et al. | June 24, 1958 |